United States Patent
He et al.

(10) Patent No.: US 12,158,640 B2
(45) Date of Patent: Dec. 3, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Rui He, Hubei (CN); Wenlong Ye, Hubei (CN); Xindong Mei, Hubei (CN); Wei Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/620,714

(22) PCT Filed: Nov. 26, 2021

(86) PCT No.: PCT/CN2021/133580
§ 371 (c)(1),
(2) Date: Dec. 19, 2021

(87) PCT Pub. No.: WO2023/087369
PCT Pub. Date: May 25, 2023

(65) Prior Publication Data
US 2024/0027800 A1    Jan. 25, 2024

(30) Foreign Application Priority Data
Nov. 18, 2021   (CN) .......................... 202111370640.8

(51) Int. Cl.
G02F 1/13       (2006.01)
G02F 1/1334     (2006.01)
(Continued)

(52) U.S. Cl.
CPC ........ *G02F 1/1323* (2013.01); *G02F 1/13345* (2021.01); *G02F 1/133528* (2013.01); *G02F 1/13363* (2013.01)

(58) Field of Classification Search
CPC ........... G02F 1/133528; G02F 1/13345; G02F 1/13363; G02F 1/133634; G02F 1/133631;
(Continued)

(56) References Cited

U.S. PATENT DOCUMENTS

| | | | | |
|---|---|---|---|---|
| 2020/0004058 A1* | 1/2020 | Harrold | ................ | G02B 6/0055 |
| 2020/0249516 A1* | 8/2020 | Tseng | .................... | G02F 1/1368 |
| 2022/0276537 A1* | 9/2022 | Kawahira | ......... | G02F 1/133567 |

FOREIGN PATENT DOCUMENTS

| | | |
|---|---|---|
| CN | 101903813 A | 12/2010 |
| CN | 106019720 A | 10/2016 |

(Continued)

OTHER PUBLICATIONS

International Search Report in International application No. PCT/CN2021/133580, mailed on Mar. 28, 2022.
Written Opinion of the International Search Authority in International application No. PCT/CN2021/133580, mailed on Mar. 28, 2022.
(Continued)

*Primary Examiner* — Mariam Qureshi
(74) *Attorney, Agent, or Firm* — PV IP PC; Wei Te Chung (57) ABSTRACT

A display panel and a display device are disclosed. The display panel includes a display liquid crystal cell, a first polarizer, a switchable liquid crystal cell, and a second polarizer. A first substrate and a second substrate of the switchable liquid crystal cell are formed of transparent flexible substrates which are substituted for glass substrates, and a first phase compensation film group including at least a first C-type compensation film group is provided, which is used to compensate the phase difference caused by the phase
(Continued)

retardation when the polarized light passes through the transparent flexible substrates, thereby reducing the thickness and weight of the display panel.

16 Claims, 3 Drawing Sheets

(51) Int. Cl.
   *G02F 1/1335* (2006.01)
   *G02F 1/13363* (2006.01)
(58) Field of Classification Search
   CPC ............ G02F 2413/01; G02F 2413/00; G02F 2413/06; G02F 2413/11; G02F 1/1334; G02B 5/3083
   See application file for complete search history.

(56) References Cited

FOREIGN PATENT DOCUMENTS

| | | |
|---|---|---|
| CN | 211956079 U | 11/2020 |
| CN | 112394547 A | 2/2021 |
| CN | 112394574 A | 2/2021 |
| CN | 113330598 A | 8/2021 |
| CN | 113552741 A | 10/2021 |
| JP | 2014215360 A | 11/2014 |
| JP | 2017037150 A | 2/2017 |
| KR | 20080059832 A | 7/2008 |

OTHER PUBLICATIONS

Chinese Office Action issued in corresponding Chinese Patent Application No. 202111370640.8 dated Jul. 4, 2022, pp. 1-9.

\* cited by examiner

DISPLAY PANEL AND DISPLAY DEVICE

FIELD OF INVENTION

The present disclosure relates to the field of display technology, and more particularly, to a display panel and a display device.

BACKGROUND OF INVENTION

A switchable liquid crystal cell, which is configured for controlling viewing angles, is provided on one side of an existing display liquid crystal cell, so that the display panel is switchable between a privacy mode with narrow viewing angles and a sharing mode with wide viewing angles. The switchable liquid crystal cell includes an upper substrate, a lower substrate, a polymer network disposed between the upper and lower substrates, and switchable liquid crystal molecules distributed in the polymer network. Since the upper and lower substrates are both glass substrates, the overall thickness and weight of the privacy monitor are increased, which is contrary to the trend of lightening and thinning the existing display.

SUMMARY OF INVENTION

Technical Problem

A display panel and a display device are disclosed in embodiments of the present disclosure to solve the technical problem that the overall thickness and weight of the existing display panel are increased since the upper and lower substrates of the switchable liquid crystal cell are both glass substrates, which does not facilitate lightening and thinning the display panel.

Technical Solutions

In order to solve the aforementioned problem, the technical solutions are provided in the present disclosure as below.

A display panel is disclosed in the present disclosure, which includes:
a display liquid crystal cell;
a first polarizer disposed on one side of the display liquid crystal cell;
a switchable liquid crystal cell disposed on one side of the display liquid crystal cell away from the first polarizer, wherein the switchable liquid crystal cell includes:
a first substrate;
a second substrate disposed opposite the first substrate, wherein the second substrate is disposed on one side of the first substrate close to the first polarizer;
a switchable liquid crystal layer disposed between the first substrate and the second substrate, wherein the switchable liquid crystal layer includes a polymer network and a plurality of switchable liquid crystal molecules distributed in the polymer network; and
a first phase compensation film group disposed between the display liquid crystal cell and the second polarizer, wherein the first phase compensation film group at least includes a first C-type compensation film group;
a second polarizer disposed on one side of the switchable liquid crystal cell away from the first polarizer; and
a third polarizer disposed on one side of the display liquid crystal cell away from the first polarizer;
wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

According to the display panel disclosed in the present disclosure, the first C-type compensation film group includes a first C-type compensation film. The first C-type compensation film is disposed on one side of the first substrate away from the second substrate, or the first C-type compensation film is disposed on one side of the first substrate close to the second substrate.

According to the display panel disclosed in the present disclosure, the first C-type compensation film group includes a second C-type compensation film. The second C-type compensation film is disposed on one side of the second substrate away from the first substrate, or the second C-type compensation film is disposed on one side of the second substrate close to the first substrate.

According to the display panel disclosed in the present disclosure, the first C-type compensation film group further includes a second C-type compensation film. The second C-type compensation film is disposed on one side of the second substrate away from the first substrate, or the second C-type compensation film is disposed on one side of the second substrate close to the first substrate;
wherein a sum of a phase retardation of the first C-type compensation film in the film thickness direction and the phase retardation of the first substrate in the film thickness direction ranges from −30 nm to 30 nm, and a sum of a phase retardation of the second C-type compensation film in the film thickness direction and the phase retardation of the second substrate in the film thickness direction ranges from −30 nm to 30 nm.

According to the display panel disclosed in the present disclosure, a thickness of the first C-type compensation film group ranges from 1 micron to 10 microns.

According to the display panel disclosed in the present disclosure, materials of the first substrate and the second substrate include any one or more combinations of transparent polyimide, polyethylene terephthalate, polyethylene naphthalate, and cycloolefin polymers.

According to the display panel disclosed in the present disclosure, a thickness of the first substrate and the second substrate ranges from 10 microns to 30 microns.

According to the display panel disclosed in the present disclosure, the first phase compensation film group further includes an A-type compensation film group, and the A-type compensation film group is located on one side of the first C-type compensation film group away from the first polarizer.

According to the display panel disclosed in the present disclosure, the display liquid crystal cell includes:
a third substrate;
a fourth substrate disposed opposite the third substrate, wherein the fourth substrate is disposed on one side of the third substrate close to the first polarizer;
a display liquid crystal layer disposed between the third substrate and the fourth substrate, wherein the display liquid crystal layer includes a plurality of display liquid crystal molecules; and
a second phase compensation film group disposed between the switchable liquid crystal cell and the first polarizer, wherein the second phase compensation film group at least includes a second C-type compensation film group;

wherein the third substrate and the fourth substrate are transparent flexible substrates, and a sum of a phase retardation of the second C-type compensation film group in the film thickness direction and phase retardations of the third substrate and the fourth substrate in the film thickness direction ranges from −30 nm to 30 nm.

According to the display panel disclosed in the present disclosure, the sum of the phase retardation of the first C-type compensation film group in the film thickness direction and the phase retardations of the first substrate and the second substrate in the film thickness direction is zero.

A display panel is disclosed in the present disclosure, which includes:
- a display liquid crystal cell;
- a first polarizer disposed on one side of the display liquid crystal cell;
- a switchable liquid crystal cell disposed on one side of the display liquid crystal cell away from the first polarizer, wherein the switchable liquid crystal cell includes:
- a first substrate;
- a second substrate disposed opposite the first substrate, wherein the second substrate is disposed on one side of the first substrate close to the first polarizer;
- a switchable liquid crystal layer disposed between the first substrate and the second substrate, wherein the switchable liquid crystal layer includes a polymer network and a plurality of switchable liquid crystal molecules distributed in the polymer network; and
- a first phase compensation film group disposed between the display liquid crystal cell and the second polarizer, wherein the first phase compensation film group at least includes a first C-type compensation film group; and
- a second polarizer disposed on one side of the switchable liquid crystal cell away from the first polarizer;
- wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

According to the display panel disclosed in the present disclosure, the first C-type compensation film group includes a first C-type compensation film. The first C-type compensation film is disposed on one side of the first substrate away from the second substrate, or the first C-type compensation film is disposed on one side of the first substrate close to the second substrate.

According to the display panel disclosed in the present disclosure, the first C-type compensation film group includes a second C-type compensation film. The second C-type compensation film is disposed on one side of the second substrate away from the first substrate, or the second C-type compensation film is disposed on one side of the second substrate close to the first substrate.

According to the display panel disclosed in the present disclosure, the first C-type compensation film group further includes a second C-type compensation film. The second C-type compensation film is disposed on one side of the second substrate away from the first substrate, or the second C-type compensation film is disposed on one side of the second substrate close to the first substrate;
wherein a sum of a phase retardation of the first C-type compensation film in the film thickness direction and the phase retardation of the first substrate in the film thickness direction ranges from −30 nm to 30 nm, and a sum of a phase retardation of the second C-type compensation film in the film thickness direction and the phase retardation of the second substrate in the film thickness direction ranges from −30 nm to 30 nm.

According to the display panel disclosed in the present disclosure, a thickness of the first C-type compensation film group ranges from 1 micron to 10 microns.

According to the display panel disclosed in the present disclosure, materials of the first substrate and the second substrate include any one or more combinations of transparent polyimide, polyethylene terephthalate, polyethylene naphthalate, and cycloolefin polymers.

According to the display panel disclosed in the present disclosure, a thickness of the first substrate and the second substrate ranges from 10 microns to 30 microns.

According to the display panel disclosed in the present disclosure, the first phase compensation film group further includes an A-type compensation film group, and the A-type compensation film group is located on one side of the first C-type compensation film group away from the first polarizer.

According to the display panel disclosed in the present disclosure, the display liquid crystal cell includes:
- a third substrate;
- a fourth substrate disposed opposite the third substrate, wherein the fourth substrate is disposed on one side of the third substrate close to the first polarizer;
- a display liquid crystal layer disposed between the third substrate and the fourth substrate, wherein the display liquid crystal layer includes a plurality of display liquid crystal molecules; and
- a second phase compensation film group disposed between the switchable liquid crystal cell and the first polarizer, wherein the second phase compensation film group at least includes a second C-type compensation film group;
- wherein the third substrate and the fourth substrate are transparent flexible substrates, and a sum of a phase retardation of the second C-type compensation film group in the film thickness direction and phase retardations of the third substrate and the fourth substrate in the film thickness direction ranges from −30 nm to 30 nm.

A display device is disclosed in the present disclosure, which includes the aforementioned display panel and a backlight disposed on one side of the display panel;
wherein the display panel includes:
- a display liquid crystal cell;
- a first polarizer disposed on one side of the display liquid crystal cell;
- a switchable liquid crystal cell disposed on one side of the display liquid crystal cell away from the first polarizer, wherein the switchable liquid crystal cell comprises:
- a first substrate;
- a second substrate disposed opposite the first substrate, and the second substrate is disposed on one side of the first substrate close to the first polarizer;
- a switchable liquid crystal layer disposed between the first substrate and the second substrate, wherein the switchable liquid crystal layer comprises a polymer network and a plurality of switchable liquid crystal molecules distributed in the polymer network; and
- a first phase compensation film group disposed between the display liquid crystal cell and the second polarizer, wherein the first phase compensation film group at least comprises a first C-type compensation film group;
- a second polarizer disposed on one side of the switchable liquid crystal cell away from the first polarizer; and wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

Beneficial Effects

The beneficial effects in the present disclosure are as follows: In the display panel and display device disclosed in the present disclosure, for both the first and second substrates of the switchable liquid crystal cell, the glass substrates in the prior art are replaced with the transparent flexible substrates. A first phase compensation film group is provided on this basis. The first phase compensation film group is disposed between the display liquid crystal cell and the second polarizer, and the first phase compensation film group at least includes a first C-type compensation film group, so that a phase difference due to the phase retardation caused when the polarized light passes through the transparent flexible substrates is compensated, thereby significantly reducing the thickness and weight of the display panel without affecting the anti-peep effect, which facilitates realizing lightness and thinness.

DESCRIPTION OF DRAWINGS

In order to describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF NUMERAL REFERENCE display liquid crystal cell 1; first polarizer 2; switchable liquid crystal cell 3; second polarizer 4; third polarizer 5;
third substrate 11; fourth base plate 12; display liquid crystal layer 13; display liquid crystal molecule 131; second C-type compensation film group 14; third electrode layer 15; fourth electrode layer 16; third alignment layer 17; fourth alignment layer 18;
first substrate 31; second substrate 32; switchable liquid crystal layer 33; polymer network 331; switchable liquid crystal molecule 332; first C-type compensation film group 34; first C-type compensation film 341; second C-type compensation film 342; first electrode layer 35; second electrode layer 36; first alignment layer 37; second alignment layer 38;
first light 61; second light 62; third light 63.

DETAILED DESCRIPTION OF PREFERRED EMBODIMENTS

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure. Moreover, it should be understood that the specific embodiments described herein are merely used to illustrate and explain the embodiments of the present disclosure, rather than being intended to limit the present disclosure. In the present disclosure, unless otherwise specified, the used location terms, such as "up" and "down", usually refer to up and down the device in actual use or working state, and specifically refer to the drawing direction in the attached drawings; "inside" and "outside" are for the contour of the device.

Figure 1:
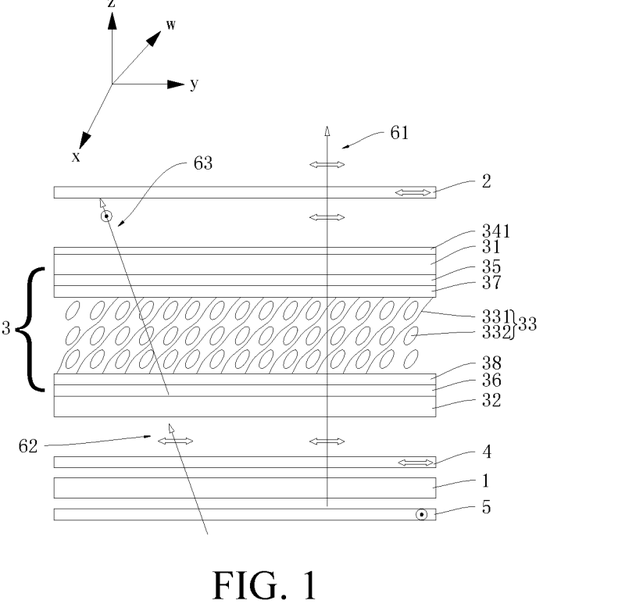
FIG. 1 is a cross-sectional structural diagram of a first display panel disclosed in one embodiment of the present disclosure.

Reference is made to FIG. 1. FIG. 1 is a cross-sectional structural diagram of a first display panel disclosed in one embodiment of the present disclosure. The embodiment of the present disclosure provides a display panel, which includes a display liquid crystal cell 1, a first polarizer 2, a switchable liquid crystal cell 3, and a second polarizer 4, wherein the first polarizer 2 is disposed on one side of the display liquid crystal cell 1, the switchable liquid crystal cell 3 is disposed on one side of the display liquid crystal cell 1 away from the first polarizer 2, and the second polarizer 4 is disposed on one side of the switchable liquid crystal cell 3 away from the first polarizer 2.

The first polarizer 2 is disposed opposite the second polarizer 4. An optical axis direction of the first polarizer 2 is parallel to an optical axis direction of the second polarizer 4, and the switchable liquid crystal cell 3 is disposed between the first polarizer 2 and the second polarizer 4.

The switchable liquid crystal cell 3 includes a first substrate 31, a second substrate 32, a switchable liquid crystal layer 33, and a first phase compensation module. The first substrate 31 is disposed opposite the second substrate 32, the second substrate 32 is disposed on one side of the first substrate 31 close to the first polarizer 2, and the switchable liquid crystal layer 33 is disposed between the first substrate 31 and the second substrate 32. The first phase compensation module is disposed between the display liquid crystal cell 1 and the second polarizer 4. The switchable liquid crystal layer 33 includes a polymer network 331 and a plurality of switchable liquid crystal molecules 332 distributed in the polymer network 331, wherein the polymer network 331 is disposed along the first direction W, and the first direction W is inclined with respect to the normal line of the first polarizer 2.

It should be noted in the embodiments of the present disclosure, the first mode is a privacy mode, and the second mode is a normal display mode. Moreover, the switchable liquid crystal layer 33 is used in the first mode, so that the first light 61 incident along the normal direction Z of the first polarizer 2 pass through the second polarizer 4, and the second light 62 incident along the direction inclined with the normal direction Z of the first polarizer 2 is blocked or partially blocked by the second polarizer 4. Additionally, in the second mode, the long axes of the switchable liquid crystal molecules 332 are different from the first direction, so that more light can pass through the second polarizer 4 to improve the range of the viewing angles of the display panel under the second mode. As a result, the viewing angles of the display panel in the second mode are greater than the viewing angles of the display panel in the first mode.

In the first mode, the long axes of the switchable liquid crystal molecule 332 are arranged along the first direction w. In the second mode, the long axes of the switchable liquid crystal molecules 332 are arranged along the second directions, wherein the second direction is different from the first direction w, and the viewing angles of the display panel in the first mode are less than the view angles of the display panel in the second mode.

It can be understood that the tilt directions of the switchable liquid crystal molecules 332 are within the YZ plane, and the first light 61 and the second light 62 propagate in the XZ plane. For the first light 61, since its polarization direction only passes through the long axes of the switchable liquid crystal molecules 332, there is no occurrence of phase difference after the first light 61 passes through the switchable liquid crystal molecules 332. That is, the polarization direction is not changed. For the second light 62, since there is a certain angle from its polarization direction to the switchable liquid crystal molecules 332, the phase differences between the no and ne directions of the switchable liquid crystal molecules 332 and the second light 62 occur, resulting in a change of the polarization direction. When the phase difference Re=λ/2+nλ (n is an integer) and the angle between the polarization direction of the second light 62 and the switchable liquid crystal molecule 332 is 45 degrees, the polarization direction of the second light 62 is deflected by 90 degrees after passing through the switchable liquid crystal molecules 332. The second light 62 is deflected into the third light 63 and the polarization direction is changed, so that it cannot directly pass through the second polarizer 4. The third light 63 are blocked by the second polarizer 4, so as to achieve the purpose of reducing the brightness at the side viewing angles. At this time, the user can only view the display panel from the front viewing angles, but for other viewing angles, there is no displayed image of the display panel, thereby activating the anti-peep function.

It can be understood that the first substrate 31 and the second substrate 32 are transparent flexible substrates. In the present disclosure, for both the first substrate 31 and the second substrate 32 of the switchable liquid crystal cell 3, by replacing the glass substrates in the prior art with the transparent flexible substrates, the thickness and weight of the display panel can be significantly reduced, thereby facilitating realizing lightness and thinness.

Moreover, because the glass is an isotropic inorganic substance, which does not have the characteristic of birefringence, the polarized light may not produce a phase difference when passing through the glass substrate. On the contrary, the transparent flexible substrate is a polymer film material. Since the polymer film material is a linear molecule, it usually has the characteristic of birefringence: nx=ny<nz, wherein nz is the refractive index in the film thickness direction, nx and ny are refractive indices in the film surface direction. When the polarized light passes through the transparent flexible substrate, a phase retardation occurs in the film thickness direction, and thus a phase difference is formed. That is, when the polarized light emitted from the display liquid crystal cell 1 passes through the first substrate 31 and the second substrate 32, birefringence occurs, which results in the phase retardation, thereby forming the phase difference.

In order to solve the aforementioned defects, in the present disclosure, the first C-type compensation film group 34 is provided, and a sum of the phase retardation of the first C-type compensation film group 34 in the film thickness direction and the phase retardations of the first substrate 31 and the second substrate 32 in the film thickness direction ranges from −30 nm to 30 nm, so that the phase difference caused by the phase retardation when the polarized light passes through the transparent flexible substrates is compensated, which does not affect the anti-peep effect.

Preferably, the sum of the phase retardation of the first C-type compensation film group 34 in the film thickness direction and the phase retardations of the first substrate 31 and the second substrate 32 in the film thickness direction is zero, so that the phase difference caused by the phase retardation is completely compensated.

Specifically, the first C-type compensation film group 34 also has the characteristic of birefringence: nx=ny<nz, wherein nz is the refractive index in the film thickness direction and nx and ny are the refractive indices in the film surface direction. Therefore, the birefringence characteristic of the first C-type compensation film group 34 is exactly complementary to the birefringence characteristic of the first substrate 31 and the second substrate 32, so as to compensate the phase retardation Rth of the first substrate 31 and the second substrate 32 in the film thickness direction. As a result, the first substrate 31 and the second substrate 32 are equivalent to isotropic substrates to avoid affecting the anti-peep effect.

Figure 2:
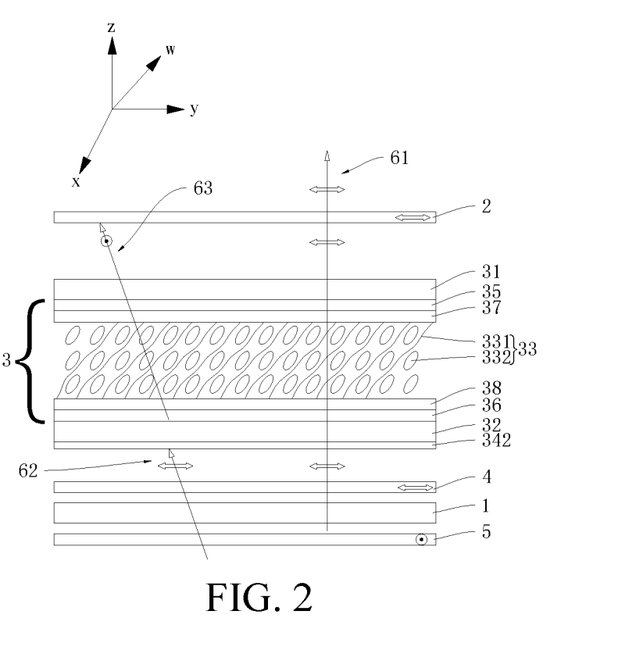
FIG. 2 is a cross-sectional structure diagram of a second display panel disclosed in one embodiment of the present disclosure.

In one embodiment, reference is still made to FIG. 1. The first C-type compensation film group 34 includes a first C-type compensation film 341. The first C-type compensation film 341 is disposed on one side of the first substrate 31 away from the second substrate 32, or is disposed on one side of the first substrate 31 close to the second substrate 32. The sum of the phase retardation of the first C-type compensation film 341 in the film thickness direction and the phase retardations of the first substrate 31 and the second substrate 32 in the film thickness direction ranges from −30 nm to 30 nm, so that the first C-type compensation film 341 can compensate the phase retardations of both the first substrate 31 and the second substrate 32 in the film thickness direction. In one embodiment, reference is made to FIG. 2. FIG. 2 is a cross-sectional structural diagram of a second display panel disclosed in one embodiment of the present disclosure. The difference of FIG. 2 from FIG. 1 is that the first C-type compensation film group 34 includes a second C-type compensation film 342. The second C-type compensation film 342 is disposed on one side of the second substrate 32 away from the first substrate 31, or is disposed on one side of the second substrate 32 close to the first substrate 31. The sum of the phase retardation of the second C-type compensation film 342 in the film thickness direction and the phase retardations of the first substrate 31 and the second substrate 32 in the film thickness direction ranges from −30 nm to 30 nm, so that the second C-type compensation film 342 can compensate the phase retardations of both the first substrate 31 and the second substrate 32 in the film thickness direction.

Figure 3:
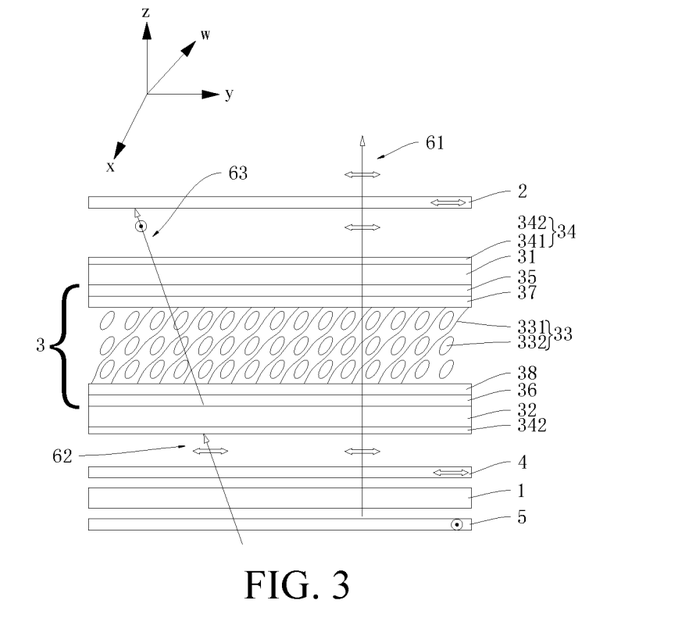
FIG. 3 is a cross-sectional structural diagram of a third display panel disclosed in one embodiment of the present disclosure.

In one embodiment, reference is made to FIG. 3. FIG. 3 is a cross-sectional structural diagram of a third display panel disclosed in one embodiment of the present disclosure. The difference of FIG. 3 from FIG. 1 is that the first C-type compensation film group 34 includes a first C-type compensation film 341 and a second C-type compensation film 342. The sum of the phase retardation of the first C-type compensation film 341 in the film thickness direction and the phase retardation of the first substrate 31 in the film thickness direction ranges from −30 nm to 30 nm, and the sum of the phase retardation of the second C-type compensation film 342 in the film thickness direction and the phase retardation of the second substrate 32 in the film thickness direction ranges from −30 nm to 30 nm. Accordingly, the first C-type compensation film 341 can compensate the phase retardation of the first substrate 31 in the film thickness direction, and the second C-type compensation film 342 can compensate the phase retardation of the second substrate 32 in the film thickness direction.

Specifically, according to the calculation formula of the phase retardation of the first C-type compensation film group 34 in the film thickness direction: Rth=[(nx+ny)/2−nz]*d, the thickness of the first C-type compensation film group 34 can be adjusted, so that the sum of the phase retardation of the first C-type compensation film group 34 in the film thickness direction and the phase retardations of the first substrate 31 and the second substrate 32 in the film thickness direction ranges from −30 nm to 30 nm.

Furthermore, the thickness of the first C-type compensation film 341 and the second C-type compensation film 342 can be adjusted respectively so that the sum of the phase retardation of the first C-type compensation film 341 in the film thickness direction and the phase retardation of the first substrate 31 in the film thickness direction ranges from −30 nm to 30 nm and the sum of the phase retardation of the second C-type compensation film 342 in the film thickness direction and the phase retardation of the second substrate 32 in the film thickness direction ranges from −30 nm to 30 nm.

Specifically, the thickness of the first C-type compensation film group 34 ranges from 1 micron to 10 microns, so as to ensure that the thickness and weight of the display panel may not be significantly increased, thereby facilitating realizing lightness and thinness.

Preferably, the sum of the phase retardation of the first C-type compensation film 341 in the film thickness direction and the phase retardation of the first substrate 31 in the film thickness direction is zero, and the sum of the phase retardation of the second C-type compensation film 342 in the film thickness direction and the phase retardation of the second substrate 32 in the film thickness direction is zero.

Optionally, the materials of the first substrate 31 and the second substrate 32 include any one or more combinations of transparent polyimide (CPI), polyethylene terephthalate (PET), polyethylene naphthalate (pen), and cycloolefin polymer (COP). Certainly, other materials may also be selected for the first substrate 31 and the second substrate 32, and the present disclosure is not limited thereto.

Specifically, the thickness of the first substrate 31 and the second substrate 32 ranges from 10 microns to 30 microns. Compared with the glass substrate used in the first substrate 31 and the second substrate 32 in the prior art (its thickness is usually greater than 300 microns), the thickness of the first substrate 31 and the second substrate 32 is significantly reduced. Moreover, the weights of the first substrate 31 and the second substrate 32 are also significantly reduced, which facilitates lightening and thinning the display panel.

Furthermore, the display panel further includes a third polarizer 5 disposed on one side of the display liquid crystal cell 1 away from the first polarizer 2, and the optical axis direction of the third polarizer 5 is perpendicular to the optical axis direction of the first polarizer 2.

Furthermore, the switchable liquid crystal cell 3 further includes a first electrode layer 35 and a second electrode layer 36. The first electrode layer 35 is disposed on the side of the first substrate 31 close to the second substrate 32, and the second electrode layer 36 is disposed on the side of the second substrate 32 close to the first substrate 31. The first electrode layer 35 and the second electrode layer 36 are used to receive voltages to control the long axes of the liquid crystal molecules to switch between the first direction and the second direction.

Figure 4:
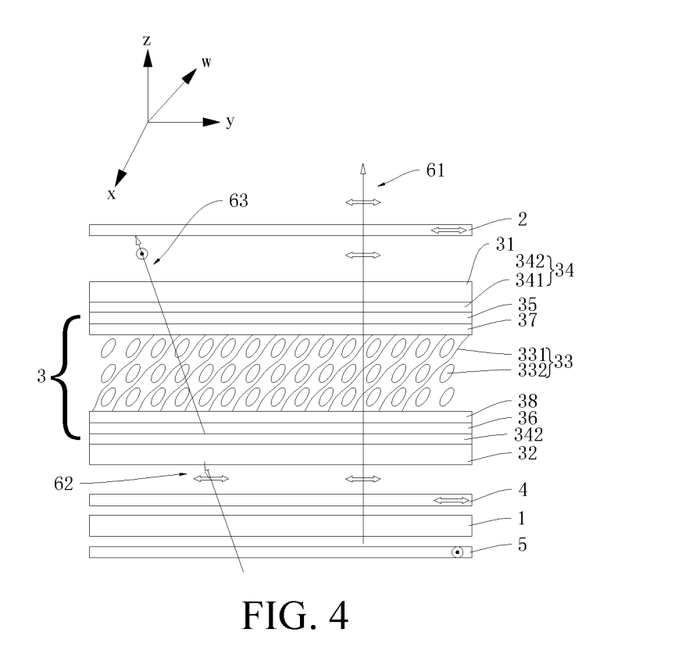
FIG. 4 is a cross-sectional structure diagram of a fourth display panel disclosed in one embodiment of the present disclosure.

Optionally, reference is made to FIG. 4. FIG. 4 is a cross-sectional structural diagram of a fourth display panel disclosed in one embodiment of the present disclosure. When the first C-type compensation film 341 is disposed on the side of the first substrate 31 close to the second substrate 32, the first C-type compensation film 341 and the first electrode layer 35 can be successively stacked on the side of the first substrate 31 close to the second substrate 32.

Optionally, when the second C-type compensation film 342 is disposed on the side of the second substrate 32 close to the first substrate 31, the second C-type compensation film 342 and the second electrode layer 36 can be successively stacked on the side of the second substrate 32 close to the first substrate 31.

Furthermore, the switchable liquid crystal cell 3 further includes a first alignment layer 37 and a second alignment layer 38. The first alignment layer 37 is disposed on the side of the first electrode layer 35 close to the second substrate 32, and the second alignment layer 38 is disposed on the side of the second electrode layer 36 close to the first substrate 31. The first alignment layer 37 and the second alignment layer 38 are used to provide the alignment direction for the switchable liquid crystal molecules 332, wherein the pre-tilt direction of the first alignment layer 37 and the pre-tilt direction of the second alignment layer 38 are parallel to the first direction.

Furthermore, the first phase compensation module further includes an A-type compensation film group, and the A-type compensation film group is located on the side of the first C-type compensation film group 34 away from the first polarizer 2. The A-type compensation module includes an A-type compensation film, and the A-type compensation film has the characteristic of birefringence: nz=ny<nx, wherein nz is the refractive index in the film thickness direction, nx and ny are the refractive indices in the film surface direction. When the polarized light passes through the transparent flexible substrates, the phase retardation Re may occur in the film surface direction. The A-type compensation film is used to compensate the possible phase retardation Re of the transparent flexible substrates.

Figure 5:
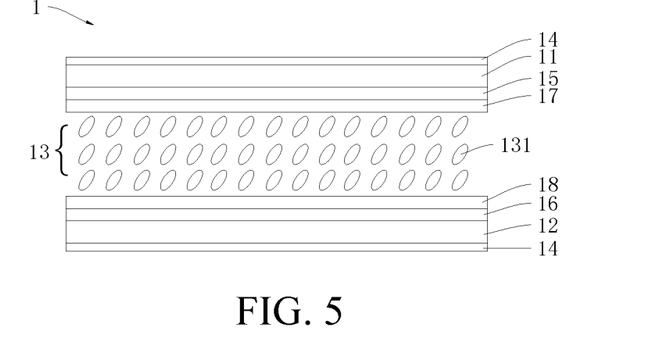
FIG. 5 is a cross-sectional structure diagram of a display liquid crystal cell disclosed in one embodiment of the present disclosure.

Specifically, reference is made to FIG. 5. FIG. 5 is a cross-sectional structural diagram of a display liquid crystal cell disclosed in one embodiment of the present disclosure. The display liquid crystal cell 1 includes a third substrate 11, a fourth substrate 12, a display liquid crystal layer 13, and a second phase compensation module.

The fourth substrate 12 is disposed opposite the third substrate 11, and the fourth substrate 12 is disposed on the side of the third substrate 11 close to the first polarizer 2. The display liquid crystal layer 13 is disposed between the third substrate 11 and the fourth substrate 12, and the display liquid crystal layer 13 includes a plurality of display liquid crystal molecules 131. The second phase compensation film group is disposed between the switchable liquid crystal cell 3 and the first polarizer 2.

The third substrate 11 and the fourth substrate 12 are transparent flexible substrates. In the present disclosure, for the third substrate 11 and the fourth substrate 12 of the display liquid crystal cell 1, by replacing the glass substrates in the prior art with the transparent flexible substrates, the thickness and weight of the display panel can be significantly reduced, which facilitating realizing lightness and thinness.

Moreover, the second C-type compensation film group 14 is provided, so that the sum of the phase retardation of the second C-type compensation film group 14 in the film thickness direction and the phase retardations of the third substrate 11 and the fourth substrate 12 in the film thickness direction ranges from −30 nm to 30 nm, so that the phase difference caused by the phase retardation when the polarized light passes through the transparent flexible substrates can be compensated without affecting the anti-peep effect. For the principle thereof, refer to the specific descriptions of the phase compensation of the first C-type compensation film group 34 for the third substrate 11 and the fourth substrate 12 in the aforementioned embodiments, and the further description is not given herein.

Similarly, it is preferable that the sum of the phase retardation of the second C-type compensation film group 14 in the film thickness direction and the phase retardations of the third substrate 11 and the fourth substrate 12 in the film thickness direction is zero.

Furthermore, the display liquid crystal cell 1 further includes a third electrode layer 15 and a fourth electrode layer 16. The third electrode layer 15 is disposed on the side of the third substrate 11 close to the fourth substrate 12, and the third electrode layer 15 is disposed on the side of the fourth substrate 12 close to the third substrate 11. The third electrode layer 15 and the fourth electrode layer 16 are used to receive voltages to control the twist of the display liquid crystal molecules 131.

Furthermore, the display liquid crystal cell 1 further includes a third alignment layer 17 and a fourth alignment layer 18. The third alignment layer 17 is disposed on the side of the third electrode layer 15 close to the fourth substrate 12, and the fourth alignment layer 18 is disposed on the side of the fourth electrode layer 16 close to the third substrate 11. The third alignment layer 17 and the fourth alignment layer 18 are used to provide the alignment direction for the display liquid crystal molecules 131.

A display device is also disclosed in the embodiments of the present disclosure. The display device includes the display panel in the aforementioned embodiments and a backlight module. The backlight module is disposed on one side of the display panel to provide a backlight source for the display panel.

Preferably, the backlight module includes a direct-type backlight source, so that the amount of the light incident along the normal direction of the first polarizer 2 can be increased when the display panel in the first mode in the embodiments of the present disclosure, thereby enhancing the display brightness at the front view angles in the first mode to improve the display effect in the first mode. When the display panel is in the second mode, since the arrangement direction of the switchable liquid crystal molecules 332 is different from the tilt direction of the polymer network 331, the light passing through the switchable liquid crystal layer 33 may generate the scattering effect. As a result, the light of the direct-type backlight diverges, which enhances the visibility at wide viewing angles in the second mode, so that the display device still has an excellent display effect at wide viewing angles in the second mode.

It should be noted that the backlight module disclosed in the embodiments of the present disclosure is not limited to a direct-type backlight source, and it may also be other existing backlight sources, such as an edge-type backlight, which is not limited thereto.

The beneficial effects are as follows. In the display panel and display device disclosed in the present disclosure, for both the first and second substrates of the switchable liquid crystal cell, the glass substrates in the prior art are replaced with the transparent flexible substrates, and a first phase compensation film group is provided on this basis. The first phase compensation film group is disposed between the display liquid crystal cell and the second polarizer and at least includes a first C-type compensation film group, so that a phase difference due to the phase retardation caused when the polarized light passes through the transparent flexible substrates is compensated, thereby significantly reducing the thickness and weight of the display panel without affecting the anti-peep effect, which facilitates realizing lightness and thinness.

In summary, although the present disclosure has been described with the preferred embodiment, the preferred embodiment is not intended to limit the present disclosure. For a person of ordinary skill in the art, equivalent replacements or changes can be made without departing from the scope and the spirit of the disclosure that is intended to be limited only by the appended claims.

What is claimed is:

1. A display panel, comprising:
a display liquid crystal cell;
a first polarizer, disposed on one side of the display liquid crystal cell;
a second polarizer, disposed between the first polarizer and the display liquid crystal cell;
a switchable liquid crystal cell, disposed between the first polarizer and the second polarizer and comprising:
a first substrate, disposed between the first polarizer and the second polarizer;
a second substrate, disposed opposite the first substrate and disposed between the first substrate and the second polarizer;
a switchable liquid crystal layer, disposed between the first substrate and the second substrate and comprising a polymer network and a plurality of switchable liquid crystal molecules distributed in the polymer network; and
a first phase compensation film group, disposed between the first polarizer and the second polarizer, wherein the first phase compensation film group at least comprises a first C-type compensation film group, and the first C-type compensation film group comprises a first C-type compensation film disposed between one of the first substrate and the second substrate and the switchable liquid crystal layer; and
a third polarizer, disposed on one side of the display liquid crystal cell facing away from the second polarizer,
wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

2. The display panel according to claim 1, wherein the first C-type compensation film group further comprises a second C-type compensation film disposed between the other one of the first substrate and the second substrate and the switchable liquid crystal layer;
wherein a sum of a phase retardation of the first C-type compensation film in the film thickness direction and the phase retardation of the one of the first substrate and the second substrate in the film thickness direction ranges from −30 nm to 30 nm, and a sum of a phase retardation of the second C-type compensation film in the film thickness direction and the phase retardation of the other one of the first substrate and the second substrate in the film thickness direction ranges from −30 nm to 30 nm.

3. The display panel according to claim 1, wherein a thickness of the first C-type compensation film group ranges from 1 micron to 10 microns.

4. The display panel according to claim 1, wherein materials of the first substrate and the second substrate include any one or more combinations of transparent polyimide, polyethylene terephthalate, polyethylene naphthalate, and cycloolefin polymers.

5. The display panel according to claim 1, wherein a thickness of the first substrate and the second substrate ranges from 10 microns to 30 microns.

6. The display panel according to claim 1, wherein the first phase compensation film group further comprises an A-type compensation film group located on one side of the first C-type compensation film group away from the first polarizer.

7. The display panel according to claim 1, wherein the display liquid crystal cell comprises:
a third substrate;
a fourth substrate, disposed opposite the third substrate and disposed on one side of the third substrate facing away from the first polarizer;
a display liquid crystal layer, disposed between the third substrate and the fourth substrate and comprising a plurality of display liquid crystal molecules; and
a second phase compensation film group, disposed between the second polarizer and the third polarizer, wherein the second phase compensation film group at least comprises a second C-type compensation film group; and
wherein the third substrate and the fourth substrate are transparent flexible substrates, and a sum of a phase retardation of the second C-type compensation film group in the film thickness direction and phase retardations of the third substrate and the fourth substrate in the film thickness direction ranges from −30 nm to 30 nm.

8. The display panel according to claim 1, wherein the sum of the phase retardation of the first C-type compensation film group in the film thickness direction and the phase retardations of the first substrate and the second substrate in the film thickness direction is zero.

9. A display panel, comprising:
a display liquid crystal cell;
a first polarizer, disposed on one side of the display liquid crystal cell;
a second polarizer, disposed between the first polarizer and the display liquid crystal cell;
a switchable liquid crystal cell, disposed between the first polarizer and the second polarizer and comprising:
a first substrate, disposed between the first polarizer and the second polarizer;
a second substrate, disposed opposite the first substrate and disposed between the first substrate and the second polarizer;
a switchable liquid crystal layer, disposed between the first substrate and the second substrate and comprising a polymer network and a plurality of switchable liquid crystal molecules distributed in the polymer network; and
a first phase compensation film group, disposed between the first polarizer and the second polarizer, wherein the first phase compensation film group at least comprises a first C-type compensation film group, and the first C-type compensation film group comprises a first C-type compensation film disposed between one of the first substrate and the second substrate and the switchable liquid crystal layer; and
wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

10. The display panel according to claim 9, wherein the first C-type compensation film group further comprises a second C-type compensation film disposed between the other one of the first substrate and the second substrate and the switchable liquid crystal layer;
wherein a sum of a phase retardation of the first C-type compensation film in the film thickness direction and the phase retardation of the one of the first substrate and the second substrate in the film thickness direction ranges from −30 nm to 30 nm, and a sum of a phase retardation of the second C-type compensation film in the film thickness direction and the phase retardation of the other one of the first substrate and the second substrate in the film thickness direction ranges from −30 nm to 30 nm.

11. The display panel according to claim 9, wherein a thickness of the first C-type compensation film group ranges from 1 micron to 10 microns.

12. The display panel according to claim 9, wherein materials of the first substrate and the second substrate include any one or more combinations of transparent polyimide, polyethylene terephthalate, polyethylene naphthalate, and cycloolefin polymers.

13. The display panel according to claim 9, wherein a thickness of the first substrate and the second substrate ranges from 10 microns to 30 microns.

14. The display panel according to claim 9, wherein the first phase compensation film group further comprises an A-type compensation film group located on one side of the first C-type compensation film group away from the first polarizer.

15. The display panel according to claim 9, wherein the display liquid crystal cell comprises:
a third substrate;
a fourth substrate, disposed opposite the third substrate and disposed on one side of the third substrate facing away from the first polarizer;
a display liquid crystal layer, disposed between the third substrate and the fourth substrate and comprising a plurality of display liquid crystal molecules; and
a second phase compensation film group, disposed between the second polarizer and a third polarizer, wherein the second phase compensation film group at least comprises a second C-type compensation film group; and
wherein the third substrate and the fourth substrate are transparent flexible substrates, and a sum of a phase retardation of the second C-type compensation film group in the film thickness direction and phase retardations of the third substrate and the fourth substrate in the film thickness direction ranges from −30 nm to 30 nm.

16. A display device comprising a display panel and a backlight disposed on one side of the display panel, wherein the display panel comprises:
   a display liquid crystal cell;
   a first polarizer, disposed on one side of the display liquid crystal cell;
   a second polarizer, disposed between the first polarizer and the display liquid crystal cell;
   a switchable liquid crystal cell, disposed between the first polarizer and the second polarizer and comprising:
      a first substrate, disposed between the first polarizer and the second polarizer;
      a second substrate, disposed opposite the first substrate and disposed between the first substrate and the second polarizer;
      a switchable liquid crystal layer, disposed between the first substrate and the second substrate and comprising a polymer network and a plurality of switchable liquid crystal molecules distributed in the polymer network; and
   a first phase compensation film group, disposed between the first polarizer and the second polarizer, wherein the first phase compensation film group at least comprises a first C-type compensation film group, and the first C-type compensation film group comprises a first C-type compensation film disposed between one of the first substrate and the second substrate and the switchable liquid crystal layer; and
wherein the first substrate and the second substrate are transparent flexible substrates, and a sum of a phase retardation of the first C-type compensation film group in a film thickness direction and phase retardations of the first substrate and the second substrate in the film thickness direction ranges from −30 nm to 30 nm.

* * * * *